(12) United States Patent
Troupe (10) Patent No.: US 9,306,739 B1
(45) Date of Patent: Apr. 5, 2016

(54) QUANTUM KEY DISTRIBUTION PROTOCOL PROCESS

(71) Applicant: James E. Troupe, Austin, TX (US)

(72) Inventor: James E. Troupe, Austin, TX (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/548,167

(22) Filed: Nov. 19, 2014

(51) Int. Cl.
*H04B 10/70* (2013.01)
*H04B 10/85* (2013.01)
*H04L 9/08* (2006.01)

(52) U.S. Cl.
CPC .................................. *H04L 9/0852* (2013.01)

(58) Field of Classification Search
CPC ........ H04B 10/70; H04B 10/85; H04L 9/002; H04L 9/819; H04L 9/852; H04L 9/858; H04L 9/883
USPC ............................ 380/255, 256, 277, 278, 283
See application file for complete search history.

(56) References Cited

U.S. PATENT DOCUMENTS

| 8,391,486 B2* | 3/2013 | Troupe | H04L 9/0852 380/255 |
| 2014/0119537 A1* | 5/2014 | Legre | H04L 9/0852 380/28 |

OTHER PUBLICATIONS

Sun et al., "Single-Photon-Detection Attack on the Phase-Coding Continuous-Variable Quantum Cryptography" published Jul. 5, 2012 by National University of Defense Technology.*

Liang et al., "Security Analysis on Some Experimental Quantum Key Distribution Systems with Imperfect Optical and Electrical Devices" published Dec. 9, 2013 by National University of Defense Technology.*

(Continued)

*Primary Examiner* — Joseph P Hirl
*Assistant Examiner* — Kalish Bell
(74) *Attorney, Agent, or Firm* — Gerhard W. Thielman, Esq.

(57) ABSTRACT

A communication process is provided for sending a qubit message between Alice and Bob using a quantum channel for obviating a faked-state attack by Eve. The qubit message is composed of ensemble bits and transmitted as a plurality of photons into the quantum channel. Each photon has a corresponding bit value. The process includes: Alice preparing three uniformly random bit strings each of length 4N to produce strings R (raw key), P (bit basis) and U (unitary operation), and Bob preparing two uniformly random bit strings of the same length to produce strings M (bit basis) and V (unitary operation). Alice broadcasts P, applies her unitary operation and records a first weak measurement to the photons for transmission. Meanwhile Bob broadcasts M, applies his unitary operation and records both a second weak measurement and a strong measurement to the photons. Alice segregates her key and weak measurement strings to produce corresponding truncated strings from differing bases in P and M, and broadcasts the truncated key string. Bob segregates his weak and strong measurement strings from the differing bases to produce corresponding truncated strings, broadcasting the truncated strong measurement string. Bob then compares an average of his truncated weak measurement string to a security threshold as a first condition. Alice compares an average of her truncated weak measurement string to the security threshold as a second condition. If both conditions are satisfactory, Alice segregates a new truncated key string from R by selecting same bases in P and M for sending to Bob.

14 Claims, 1 Drawing Sheet

(56) References Cited

OTHER PUBLICATIONS

C. H. Bennett et aL, "Quantum Cryptography: Public key distribution and Coin Tossing", *IEEE Int'l Conf on Computers Systems & Signal Processing*, Dec. 1984. http://www.cs.ucsb.edu/~chong/290N-W06/BB84.pdf.

A. K. Ekert, "Quantum Cryptography Based on Bell's Theorem", *Phys. Rev. Ltrs.* 67, 6 (1991) 661-663.

C. H. Bennett et al., "Quantum Cryptography without Bell's Theorem" *Phys. Rev. Ltrs*, 68, 5 (1992) 557-559.

Y. Aharonov et al., "Time Symmetry . . . ", *Phys. Rev.* 134 (1964) 2538. http://www.tau.ac.il/~yakir/yahp/yh150.

Y. Aharonov et al., "Properties of a Quantum System during the time interval between two measurements", *Phys. Rev. A* 41,11 (1990). http://www.tau.ac.il/~yakir/yahp/yh66.

Y. Makarov et al., "Faked states attack on quantum cryptosystems", *J. of Modern Optics* 52, 5, 20 (2005) 691-705. http://www.vad1.com/lab/paper-makarov-2005/paper-makarov-2005.pdf.

C. Wiechers et al., "After-gate attack on a quantum cryptosystem", *New J. of Physics* 13, 013043 (2011). preprint http://arxiv.org/pdf/1009.2683v1.pdf.

N. Jain et al., "Device Calibration Impacts Security of Quantum Key Distribution", *Phys. Rev. Ltrs.* 107, 110501 (2011). preprint http://arxiv.org/pdf/1103.2327v4.pdf.

L. Lydersen et al., "Superlinear threshold detectors in quantum cryptography", *Phys. Rev. A* 84, 032320 (2011). http://www.vad1.com/publications/PhysRevA-84-032320.pdf preprint http://arxiv.org/pdf/1106.2396v3.pdf.

M. Dušek et al., "Unambiguous state discrimination in quantum cryptography", *Phys. Rev. A*. 62, 022306 (2000). http://muj.optol.cz/dusek/clanky/pra62-022306.pdf preprint http://arxiv.org/pdf/quant-ph/9910106v2.pdf.

Y.-L. Tang et al., "Source attack of decoy-state quantum key distribution using phase information", *Phys. Rev. A* 88, 022308 (2013). preprint http://arxiv.org/pdf/1304.2541.pdf.

R. Hughes et al., "Refining Quantum Cryptography", *Science* 333 (2011) 1584-1586.

L. Lydersen et al., "Controlling a superconducting nanowire single-photon detector . . .", *New J. of Phys.* 13 (2011) 113042. http://www.vad1.com/publications/NewJPhys-13-113042.pdf.

M. G. Tanner et al., "Optimized Quantum Hacking of superconducting nanowire single-photon detectors", *Optics Express* 22 (2014) 6734-6748. http://www.vad1.com/publications/tanner2014.OptExpress-22/6734.pdf.

Y. Aharonov, D. Rohrlich; *Quantum Paradoxes*, (2005), 150-161 (ch. 10). http://bookfi.org/book/1163947.

J. Tollaksen, "Pre- and post-selection, weak values, and contextuality", *J. Phys. A* 40 (2007).

Y. Aharonov et al., "Quantum Averages of weak values", *Phys. Rev. A* 72 (2005) 052111. http://www.tau.ac.il/~yakir/yahp/yh161.pdf.

J. Dressel et al., "Countertextual-value Approach . . . ", *Phys. Rev. A* 85 (2012) 022123.

K. Bartkiewicz et al., "Experimental Eavesdropping . . . ", *Phys. Rev. Ltrs.* 110 (2013) 173601.

M. Tomamichel et al., "Uncertainty Relation for Smooth Entropies", *Phys. Rev. Ltrs.* 106 (2011) 110506.

J. E. Troupe, "Quantum Weak Values and Time-Symmetry . . . ", NSWCDD-MP-140035 (2014).

\* cited by examiner

FIG. 1

| Attack (No Dark Counts) 210 | \| Alice's Observed WV \| 220 | \| Bob's Observed WV \| 230 |
|---|---|---|
| No Eve | 1.000 | 1.000 |
| Intercept / Resend | 0.500 | 0.500 |
| Optimal Individual Cloning | 0.667 | 0.667 |
| Optimal Coherent Collective | 0.780 | 0.780 |
| Detector Based Hack (*e.g.* Blinding) | 1.000 | 0.000 |
| Unambiguous State Discrimination Hack | 0.000 | 1.000 |
| Both Detector and USD Hack | 0.000 | 0.000 |

FIG. 2

QUANTUM KEY DISTRIBUTION PROTOCOL PROCESS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to quantum key distribution (QKD). In particular, the invention relates to a QKD protocol that employs weak measurements to inhibit eavesdropping.

Secure key distribution constitutes an important element in reliable communication, and remains the focus of technological innovation, as represented by U.S. Pat. No. 8,391,486. Communication scenarios involve three participants: transmitter Alice, recipient Bob, and eavesdropper Eve. Alice desires to send a secure message to Bob using cryptography, while Eve attempts to intercept Alice's message. C. H. Bennett and G. Brassard described their BB84 protocol in "Quantum Cryptography: Public Key Distribution and Coin Tossing", Proceedings of the IEEE International Conference (1984), available at http://www.cs.ucsb.edu/~chong/290N-W06/BB84.pdf. A video description can be viewed at http://www.youtube.com/watch?v=UVzRbU6y7Ks. Subsequent protocols include E91 by A. Ekert, "Quantum cryptography based on Bell's theorem", *Physical Review Letters* 67 (6), 667 (1991), and BBM92 by C. H. Bennett, G. Brassard and N. D. Mermin, "Quantum Cryptography without Bell's Theorem", *Physical Review Letters* 68 (5), 557 (1992). BB84 represents a widely accepted conventional process to attempt secure communication.

SUMMARY

Conventional quantum key distribution protocols yield disadvantages addressed by various exemplary embodiments of the present invention. In particular, exemplary embodiments provide a communication process is provided for sending a qubit message between Alice and Bob using a quantum channel for obviating a faked-state attack by Eve. The qubit message is composed of ensemble bits and transmitted as a plurality of photons into the quantum channel. Each photon has a corresponding bit value. The process includes: Alice preparing three uniformly random bit strings each of length 4N to produce strings R (raw key), P (bit basis) and U (unitary operation), and Bob preparing two uniformly random bit strings of the same length to produce strings M (bit basis) and V (unitary operation). Alice broadcasts P, applies her unitary operation and records a first weak measurement to the photons for transmission. Meanwhile Bob broadcasts M, applies his unitary operation and records both a second weak measurement and a strong measurement to the photons. Alice segregates her key and weak measurement strings to produce corresponding truncated strings from differing bases in P and M, and broadcasts the truncated key string.

In these embodiments, Bob segregates his weak and strong measurement strings from the differing bases to produce corresponding truncated strings, broadcasting the truncated strong measurement string. Bob then compares an average of his truncated weak measurement string to a security threshold as a first condition. Alice compares an average of her truncated weak measurement string to the security threshold as a second condition. If both conditions are satisfactory, Alice segregates a new truncated key string from R by selecting same bases in P and M for sending to Bob.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

A Quantum Key Distribution Protocol Robust Against Side-Channel Attacks That Rely on Manipulation of Bit Error Rate Estimation—Reduce the effectiveness of large classes of side-channel attacks on practical quantum key distribution (QKD) systems while maintaining high secure key rates.—To be disclosed in a peer reviewed article that will soon be submitted for public release. —A practical QKD system with robust security against known side-channel attacks would be used to refresh secure keys in a secure communication network without relying on a public key infrastructure (PKI).

All conventional PKI systems are known to be vulnerable to any future adversary that may possess a large-scale quantum computer.—However, practical QKD systems have been compromised using a variety of exploits that utilize the behavior of crucial components of the systems. A very active area of research is exploring ways to design exemplary QKD protocols and devices that reduce the effectiveness of such attacks. The exemplary QKD protocol is an improvement over existing QKD protocols in use both academically and commercially. The protocol can be physically implemented in several different ways depending on the particular application, e.g., optical communication via fiber or free-space channels.

Exemplary embodiments provide a variation of the BB84 quantum key distribution protocol that utilizes the properties of weak values to insure the validity of the raw key bit error estimates in the protocol. The protocol is shown to be secure against recently demonstrated attacks utilizing detector blinding/control, and attacks in which Eve uses Unambiguous State Discrimination. The proposed protocol can achieve this additional security with an increase in secure key generation rate as compared to that originally promised by the standard BB84 scheme. In addition, the exemplary protocol does not require an entangled photon source.

I. Introduction: The ability to distribute secret keys for symmetric encryption without the need for a trusted courier is a fundamentally new capability promised by the most mature of quantum information technologies: quantum key distribution. Evidence of the growing maturity of this field is the commercial availability (and presumably use) of QKD based crypto-systems. Further evidence is provided by the emergence of the field of quantum hacking—the investigation and identification of the types of weakness and flaws present in practical QKD systems.

As pointed out by R. Hughes et al. in "Refining Quantum Cryptography", *Science* 333, 1584 (2011), the development of quantum hacking is an expected and positive development in the QKD field. As QKD concepts become tangible systems, the inevitable gaps that separate the theoretical protocols and the actual behavior of system components are exposed by the creative, determined efforts of scientists and engineers in the hacker community. The first goal of hacking a prospective QKD system is simply to identify and correct improperly implemented protocols. The longer term goal is to imagine and test possible avenues of attack against QKD systems whose implementations are basically sound while using the specifics of the systems' physical implementations to compromise the security.

There are at least four general categories of such attacks:

(1) hacks based on Trojan-horse components, e.g., an implanted memory device that records and reuses previously generated keys, or compromised random number generators, (2) active attacks that inject photons into the system interrogating system components that may yield information about Alice's bit and/or basis choices, (3), attacks that use the imperfections of the quantum source to acquire key information, and (4) faked-state attacks that hide the eavesdropper's interception by exploiting behavior of the QKD system components, e.g., of the detection method used, particularly that of single-photon detector technology.

All four categories of attacks are viable and must be defended against. In the case of (1), Trojan horse components, it seems very unlikely that a QKD protocol of any type will be able to guard against such attacks. The only effective strategy for dealing with such possibilities is to thoroughly understand and verify the origin, function, construction, and behavior of all QKD system components. For category (2), careful system design and characterization are the first line of defense, with consideration of the trade-off between implementation choices and the protocol requirements.

Significant ongoing research into improving methods of deterministic single photon generation will address (3), which includes beam-splitter attacks. In the case of (4), faked-state attacks (FS-attacks), the essentially unavoidable access Eve has to Bob's detectors, combined with the very non-trivial complexity and behavior of any detector system which can accurately detect single photons, leads to the existence of many attack vectors. That such FS-attacks are viable and plentiful is proven by the success of numerous QKD hacking strategies based on FS-attacks. While it might be said that many of these attacks rely on the specifics of the ubiquitous Geiger-mode avalanche photodiode (APD), two points should be made. First, because APDs are ubiquitous, such attacks have importance. Second, this general attack strategy is open against any detector technology—only the specifics of the detector behavior modification are likely to change.

This second point is underscored by recent success in applying the same blinding techniques to newly developed single photon detectors based on superconducting nanowires. This is described by L. Lydersen et al., "Controlling a superconducting nanowire single-photon detector using tailored bright illumination", *New J. Physics* 13, 113042 (2011) available at http://www.vad1.com/publications/NewJPhys-13-113042.pdf, and by M. Tanner et al., "Optimized quantum hacking of superconducting nanowire single-photon detectors", *Optics Express* 22 (6), 6734 (2014) available at http://www.vad1.com/publications/tanner2014.OptExpress-22-6734.pdf.

The foundation of a successful FS-attack is the ability of Eve to hide her presence by sufficiently biasing the estimated quantum bit error rate (QBER) that Alice and Bob calculate using part of the sifted key. In the case of detector blinding attacks, Eve accomplishes this by forcing Bob's choice of basis to match hers with a probability greater than chance. Instead of manipulating Bob's detectors, another subclass of FS-attacks utilize Eve's ability to perform Unambiguous State Discrimination (USD) on the qubits coming from Alice. Eve performs a generalized positive operator valued measurement (POVM) on the incoming photons so she can probabilistically discriminate between the various non-orthogonal photon states. This process must be probabilistic given the non-orthogonality of the cross basis pairs of states.

However, Eve can hide the resulting disturbance in the cases where state discrimination fails by only resending signals in the cases when discrimination has succeeded. Just as in the detector blinding attacks, Eve then utilizes the significant loss in the quantum channel to hide her filtering of Alice's transmitted signals. Due to the filtering Eve will then know the state of all (or at least some) of the signals transmitted to Bob; and in addition, Eve's presence will not be revealed by the QBER of the sifted key extracted from these signals.

This disclosure describes a novel process for defending against the general class of FS-attacks by introducing an exemplary protocol that utilizes a feature of quantum mechanics that has remained unexploited in BB84 and other QKD protocols: the behavior of pre- and post-selected weak measurement results. The exemplary QKD protocol has four appealing features:

(1) it is a relatively simple variation of the BB84 protocol, (2) it has a secure key generation rate at least as large as that promised by the original BB84 protocol, (3) its security is guaranteed even if Eve is assumed to have control all of the measurement devices used in the protocol, and (4) it should be straightforward to implement the exemplary protocol using current quantum optical technology.

The principle idea is that the weak values of each photon's state are equally determined by both the state prepared by Alice and Bob's measurement outcome. Weak measurements enable Alice and Bob to directly detect any intervening disturbance by Eve by looking for changes in the measurement results of each pre- and post-selected ensemble of qubits. In effect, the exemplary embodiments generalize the usual method of detecting Eve through estimation of the bit error rate to include the cases when Alice and Bob are using different bases. Such a generalization renders much more difficult attempts by Eve to avoid detection by using FS-attacks.

II. Faked-State Attacks: Quantum key distribution promises to provide security for the distribution of a shared key between two parties, Alice and Bob, using specially prepared and measured quantum bits. The security of the key rests on the inability of an eavesdropper, Eve, to obtain information about the unknown state of the qubits without disturbing their states. Popular phrases are that QKD promises security that is "guaranteed by the laws of physics" and provides "unconditional security". While the "unbreakable" security of QKD protocols themselves are indeed founded on the laws of physics, in practice there remains an inevitable mismatch between the behavior of idealized QKD schemes and those of real QKD systems. Therefore any promise of "unconditional security" must be looked at with an extremely large degree of skepticism.

The security analysis of real QKD systems must always be based on some assumptions about the specifics of the devices used to implement them. Of course, obvious non-ideal components such as noisy or lossy channels, detector inefficiencies, and detector dark counts are recognized and treated in practical QKD security analysis. In these analyses, Eve is assumed to have complete control of the losses in the channel and the dark counts in the detectors. It is further assumed that all observed signatures of noise (e.g., raw key bit errors) are due to Eve's interference. Using these assumptions, one can model the performance of the QKD system against a particular eavesdropping strategy by Eve.

For example, the maximum distance over which a secure key can be distributed may be calculated. The central part of such security analyses is to estimate the maximum amount of information about the raw key Eve may possess given the system parameters and the laws of physics. In the BB84 protocol (and variants) Eve's information is bounded by estimating the bit error rate for the quantum channel. In order estimate the true QBER, Alice and Bob must use a randomly selected subset of the distributed raw key of sufficient length that the QBER of this subset is very likely to be close to the true QBER of the remaining raw key. An important assumption made in most (BB84 and variants, as well as entanglement based E91 and BBM92) QKD protocols is that such a random subset is available to Alice and Bob, i.e., the particular subset chosen is truly randomly selected.

However, ensuring validity of this assumption in real systems has been demonstrated to be very difficult. For example, Eve can manipulate the behavior of Bob's detectors in order to bias the estimated QBER calculated by Alice and Bob such that Eve's disturbance of the qubits is not detected. Alternatively, Eve can attack Alice by using USD to probabilistically identify the photon state sent by Alice.

In the cases where Eve's discrimination is unsuccessful, Eve does not send a faked-state on to Bob, while in the other cases Eve resends the same state as Alice. Eve increases the probability of Bob's detection of these faked-state signals by manipulating the channel losses or sending multiple copies in the same time window. Because significant losses are unavoidable in any practical QKD system, Eve is able to mask the losses she induces into the channel as normal system loss.

In both types of FS-attacks, Eve is able to selectively filter out the photons which would give away her presence while preserving the signals for which she has information about either the transmitted or detected quantum state. With either the detector or USD attacks, Eve can then extract the secure key without detection by Alice and Bob because the estimated QBER will be unchanged by Eve's presence.

While addressing a specific, known method of FS-attack (e.g., Eve's control of Bob's detectors) may be possible with very careful engineering, one should note that the QBER fair sampling assumption necessary in conventional QKD protocols constitutes a fundamental weakness. Therefore, exemplary QKD protocols that eliminate the fair sampling assumption are desirable in principle, thereby removing a large class of attack vectors currently present in practical QKD systems.

Because the weak value of a quantum system is equally defined by both the initial and final state of an individual system, the weak value is a useful attribute to use for detecting the presence of Eve. Access to a system's weak value is provided statistically by the mean value of sufficiently weak measurements that have been conditioned on particular initial and final states. Any interaction between Eve and the qubit transmitted between Alice and Bob will necessarily have an effect on the correlations between the initial and final states due to state disturbance and change the observed weak measurement statistics. Of particular interest for detecting an FS-attack, such disturbances are present and observable even in the cases when Alice and Bob measure in different bases. This enables them to monitor for the presence of Eve using the half of the signals that are usually discarded at the beginning of the protocol.

For the QKD protocol introduced in this disclosure, the following assumptions about the power of Eve are listed: Eve controls the quantum channel losses, all observed bit errors are due to Eve, she can control Bob's single photon detectors completely, e.g., Eve can make a detector click or not click as she wishes, or she can alter the contents of any data stored there. Crucially, Eve is not permitted the ability to alter or know the basis choice or bit values that Alice uses to prepare each qubit. Thus, exemplary embodiments do not address attacks of types (1), (2), or (3) discussed above. In particular, this means omitting vulnerabilities due to imperfect state preparation such as multiple photons per pulse.

Future efforts will address the impact that imperfect states have on the security of the exemplary protocol. One can assume, as is usually the case, that Alice and Bob have access to a properly authenticated classical channel that Eve will be able to passively monitor. One can further assume that both Alice and Bob each locally have devices that produce the multiple, independent, and sufficiently random strings of binary numbers needed for the protocol.

In attacks on BB84, Eve can only get information about the raw key bit when she correlates her measurement system with the qubit at Alice and/or Bob's location. In the specific case of detector attacks, this means Eve's strategy is most successful when she forces Bob's measurements to match her own choice of basis. Because of the need for Bob and Eve's bases to match, Alice and Bob can detect Eve by the following method. For each photon, Bob's detection apparatus is set so that, just prior to performing the strong measurement in a particular basis (assumed chosen by Eve), Bob weakly measures in the opposite basis. The result of this weak measurement is then recorded by Bob.

For photons in which Bob's choice of measurement does not match Alice's—which must occur 50% of the time—Bob announces the bit values and the associated weak measurement results. Using this information Alice is able to calculate the weak value of the observable given the pre- and post-selected states. These weak values are ±1 in the case where Eve has not performed a measurement (i.e., intercept/resend attack), while the expectation values of Bob's weak measurement results conditioned on the pre- and post-selected states will all equal 0 when Eve has performed a strong measurement on all the photons.

Because Eve does not know the basis Alice prepared the photons in, she has no way to avoid detection by selectively measuring or not measuring photons. Also, Eve does not know the bit value of the photons that Alice prepared in the opposite basis. Therefore Eve has no way of knowing how to modify Bob's weak measurement results so that the correct conditional averages will be observed by Alice when she checks them against the values required by the associated weak values.

The exemplary protocol addresses the weakness in QKD due to the assumption that the true bit error rate can be accurately estimated by selecting a "random", and hence representative, subsample of the distributed raw key. The issue is that the assumption of randomness cannot in general be ensured by the BB84 protocol and the laws of physics—the engineering design of a practical QKD system must attempt to enforce the validity of this assumption. This exemplary extension of the BB84 protocol utilizes the properties of post-selected weak measurements to remove the vulnerability of BB84 to these violations of fair sampling.

III. Weak Measurement and Weak Values: A cursory review is presented of the concepts of weak measurement and weak values and the general formulation of Time Symmetric Quantum Mechanics (TSQM). The weak value of a quantum mechanical observable was introduced over two decades ago by Y. Aharonov, et al., "Time Symmetry in the Quantum Process of Measurement", *Physical Review* 134, B1410 (1964) available at http://www.tau.ac.il/~yakir/yahp/yh150. The weak value is experimentally obtained from the result of measurements performed upon a pre-selected and post-selected (PPS) ensemble of quantum systems when the interaction between the measurement apparatus and each system is sufficiently weak.

Unlike the standard strong measurement of a quantum mechanical observable which disturbs the measured system and "collapses" its state into an eigenstate of the observable, a weak measurement does not appreciably disturb the quantum system, and yields the weak value as the measured value of the observable. This is possible because very little information about the observable is extracted in a single weak measurement. Experimentally determining the weak value requires performing weak measurements on each member of a large ensemble of identical PPS systems and averaging the resulting values.

The standard formulation of quantum mechanics describes a quantum system at a time $t_0$ by a state that evolves in time from the past until $t_0$. TSQM also uses a second state which can be thought of as a state evolving backward in time from the future to $t_0$, as reported by Y. Aharonov and D. Rohrlich in their textbook Quantum Paradoxes (2005) (especially chapter 10), available at http://bookfi.org/book/1163947. The weak values measured at time $t_0$ are equally influenced by both of these states. Many experiments have verified the surprising and counter-intuitive aspects of weak values. In particular, they can lie far outside the associated observable's eigenvalue spectrum and can be complex valued.

The von Neumann model of quantum measurement describe weak measurements, as reported by Y. Aharonov et al., "Properties of a quantum system during the time interval between two measurements", *Physical Review A* 41 (1), 11 (1990), available at http://www.tau.ac.il/~yakir/yahp/yh66 and by J. Tollaksen, "Pre- and post-selection, weak values and contextuality", *J. of Physics A* 40, 9033 (2007), preprint available at http://arxiv.org/pdf/quant-ph/0602226v3.pdf.

Consider an observable A pertaining to a quantum system pre-selected to be in the state $|\psi_{in}\rangle$. The Hamiltonian describing the interaction between the system and measuring device (MD) is expressed as:

$$H_{int} = -g(t)\hat{Q}_{MD}\hat{A}, \quad (1)$$

where $\hat{Q}_{MD}$ is the position operator for the MD and g(t) is the interaction's coupling strength defined by:

$$g = \int g(t)dt, \quad (2)$$

is integrated over the interaction time interval $2\epsilon$ (from time $t_0-\epsilon$ to $t_0-\epsilon$). The measurement interaction is weakened by minimizing $g\Delta Q_{MD}$. Let the MD's initial pointer state $|\Phi\rangle$ be a real Gaussian pointer with unit variance in momentum.

Then the weakness of the measurement can be established (i.e., set) by setting $g \ll 1$, and $\Delta Q_{MD} = 1$. This enables the following approximation:

$$\exp[-ig\hat{Q}_{MD}\hat{A}]|\psi_{in}\rangle|\Phi\rangle \cong [1 - ig\hat{Q}_{MD}\hat{A}]\sum_i \langle a_i | \psi_{in}\rangle|a_i\rangle|\Phi\rangle \quad (3)$$

$$\cong \sum_i \langle a_i | \psi_{in}\rangle|a_i\rangle e^{-iga_i\hat{Q}_{MD}}|\Phi\rangle,$$

where $|a_i\rangle$ represents the eigenstate of the observable $\hat{A}$ with eigenvalue $a_i$. Thus, the MD is a Gaussian with means shifted by $g\langle \hat{A}\rangle$ where $\langle A\rangle$ is, as usual, the expected value of observable $\hat{A}$.

The evolution operator for the system and MD is then given by:

$$U_{meas} = \exp[-i\int_{t_0-\epsilon}^{t_0+\epsilon} H(t)dt] = \exp[-ig\hat{Q}_{MD}\hat{A}], \quad (4)$$

where the Dirac constant can be set to $\hbar = 1$, and the interaction is non-zero from $t_0-\epsilon$ to $t_0-\epsilon$. The measurement interaction is weakened by minimizing $g\Delta Q_{MD}$, where $g = \int g(t)dt$ is a constant defining the coupling strength, and $\Delta Q_{MD}$ is the uncertainty in the position observable for the MD. The final state of the measuring device can be seen to be a superposition of Gaussians in momentum space, each of which is shifted by $ga_i$ where the $a_i$ are eigenvalues of $\hat{A}$. Thus, the MD is a Gaussian with mean shifted by $g\langle A\rangle$, where $\langle \hat{A}\rangle$ is, as usual, the expectation value of $\hat{A}$. This expression for the effect of the weak measurement interaction on the MD is true for the case of a real-valued MD. This equation for the secure key length has been modified to reflect the raw key length in our variation of the BB84 protocol, i.e., the leading factor of two.

Let $|b_j\rangle$ be the non-degenerate eigenstates of a final observable $\hat{B}$. Then using the closure relation:

$$\Sigma_j |b_j\rangle\langle b_j| = \hat{I} \quad (5)$$

the expectation value of observable $\hat{A}$ can be rewritten as:

$$\langle \hat{A}\rangle = \langle\psi_{in}|\left[\sum_j |b_j\rangle\langle b_j|\right]\hat{A}|\psi_{in}\rangle = \sum_j |\langle b_j|\psi_{in}\rangle|^2 \frac{\langle b_j|\hat{A}|\psi_{in}\rangle}{\langle b_j | \psi_{in}\rangle}. \quad (6)$$

Each of the possible outcomes of a final ideal measurement of $\hat{B}$ on the system specifies a particular PPS ensemble for the system. The weak quantity:

$$(A_w)^j = \frac{\langle b_j|\hat{A}|\psi_{in}\rangle}{\langle b_j|\psi_{in}\rangle} \qquad (7)$$

is the weak value of the observable A for a system that was pre-selected in the state $|\psi_{in}\rangle$ and post-selected in the state $|b_j\rangle$.

Thus, the expectation value of any observable can be interpreted as an average of weak values $(A_w)^j$ taken over all of the different PPS ensembles, as reported by Y. Aharonov et al., "Quantum averages of weak values", *Physical Review A* 72, 052111 (2005), available at http://www.tau.ac.il/~yakir/yahp/yh161.pdf. The weighting factor $|\langle b_j|\psi_{in}\rangle|^2$ is the probability that any single system belongs to the particular PPS defined by the outcome $|b_j\rangle$.

The wave-function of the measuring device, in momentum space, after the weak measurement interaction and the post-selection is given by:

$$\langle P_{MD}|\langle\psi_f|\exp[-iq\hat{Q}_{MD}\hat{A}]|\psi_{in}\rangle|\Phi\rangle \cong \qquad (8)$$

$$\langle P_{MD}|\langle\psi_f|\psi_{in}\rangle\left\{1 - ig\hat{Q}_{MD}\frac{\langle\psi_f|\hat{A}|\psi_{in}\rangle}{\langle\psi_f|\psi_{in}\rangle}\right\}|\psi_{in}\rangle|\Phi\rangle \cong$$

$$\langle\psi_f|\psi_{in}\rangle\langle P_{MD}|\exp[-ig\hat{Q}_{MD}\hat{A}]|\Phi\rangle.$$

Thus for a weak measurement of the observable $\hat{A}$ on a particular member of a PPS ensemble, the MD state is shifted by $gA_w$ and the expectation value of the MD momentum will be:

$$\langle\hat{P}_{MD}\rangle = \langle\hat{P}_{MD}\rangle_{in} + gRe(A_w). \qquad (9)$$

Note that because the interaction is very weak, the shift is very small in relation to the uncertainty of the MD. This requires a sufficiently large ensemble of identical PPS systems and measuring devices in order to accurately determine the pointer shift and therefore accurately determine the weak value.

To experimentally access the weak value $A_w$, the weak measurement is performed on a large ensemble of identically prepared systems each in the state $|\psi_{in}\rangle$. In order to perform a post-selection, an observable $\hat{B}$ is strongly measured on each of these systems yielding a final state $|\psi_f\rangle$ that is one of the eigenstates $|b_j\rangle$. For each $b_j$, the ensemble can be divided into a distinct PPS ensemble. Every MD can then be associated with a particular PPS ensemble, so that the results of projective measurements of each MD are placed into distinct PPS ensembles. By taking the mean of all such pointer values for each PPS ensemble, one can determine the weak value $(A_w)^j$ with an uncertainty proportional to $$\frac{1}{\sqrt{N}},$$

where N is the number of members of the $b_j$ PPS ensemble.

IV. Weak Value Augmented BB84 Protocol: The central difference between the proposed protocol and BB84 (and its variants) is that the detection of Eve's presence does not rely on the estimated QBER of the sifted key. Alice and Bob independently probe the behavior of the quantum channel by means of weak measurements of particular observables, conditional on the results of the outcomes of Bob's measurements and the states prepared by Alice when the two bases disagree. Thus, the protocol uses the outcome results when Alice's and Bob's choices of basis disagree regarding the detection of Eve. This detection strategy is strictly more powerful than the sifted key QBER because any form of measurement by Eve must necessarily disturb either the incoming state from Alice or the time-reversed state back-propagated from Bob's measurement outcome.

This time-symmetric view of weak values highlights the structure of the exemplary protocol. As later described in Section V (on protocol security), the eavesdropping strategy that Eve employs can have different signatures in the observed conditional weak measurement results, thus giving Alice and Bob a higher degree of situational awareness regarding the quantum channel's security while the system is in operation. For instance, a detector blinding attack will be revealed in changes to the weak measurement results obtained by Bob only, whereas a straightforward incept/resent attack (Eve measuring all of the photons in a random basis) would show up equally in both Alice and Bob's weak measurement statistics. Finally, an attack utilizing unambiguous state discrimination would change Alice's weak measurement results, but not alter Bob's.

The exemplary protocol involves the following operations:

(1) Alice starts with three uniformly random binary bit strings of bits each of length 4N. These consist of the list R representing the raw key bit values to be sent to Bob, the string P representing the basis in which each bit will be prepared, and the string U that determines the unitary operator that Alice will apply to each photon before she sends it on to Bob. Bob starts with two uniformly random bit strings each of length 4N. These consist of the list M representing the basis in which each bit will be strongly measured, and the list V which determines the unitary operator applied by Bob to each incoming photon. Basis '0' will be the eigenstates of $\hat{\sigma}_0 \equiv \hat{\sigma}_x$ and Basis '1' will be $\hat{\sigma}_1 \equiv \hat{\sigma}_x$. The raw key bit value '0' is encoded as $|r_i=0\rangle = 0$ or $|+\rangle$ and the raw key bit value '1' is encoded as $|r_i=1\rangle = 1$ or $|-\rangle$.

(2) One at a time, Alice prepares 4N single photons in the state given by the corresponding pair of bits from R and P.

(3) For each photon, Alice performs a weak measurement of the polarization in the basis opposite to the one in which it was prepared.

Alice locally records the weak measurement results in a time ordered list α and sends each photon to Bob. Before the weak measurement has been implemented Alice applies the unitary operation $v_i$ to the $i^{th}$ photon's path in the location just after the weak measurement interaction. This unitary is selected so that if the $i^{th}$ bit of U is 0, then the identity operation is applied; while if the bit is 1, a plane flip with respect to the encoding basis is applied.

(4) Bob performs a weak measurement of each incoming photon in the basis opposite to that given by the associated bit value in his uniformly random list M, and then records the resulting pointer value in an ordered list β.

Additionally, Bob has randomly chosen to apply a unitary operation $v_i$ and applied it to the $i^{th}$ photon's path in a location just before his weak measurement interaction. If the associated bit value in V is 0, this unitary is chosen to be the identity operation, if the bit is 1, a phase flip with respect to the basis defined by the associated bit value in M is applied.

(5) Bob strongly measures each photon in the basis given by the associated bit value in the list M and records the bit value resulting from the measurement in a new list D. If no photon is detected in the given detection time window, this is noted.

(6) Bob broadcasts to Alice which photons did not arrive. Alice and Bob remove the elements associated with these photons from lists R, P, M, α, β, U and V.

(7) Bob broadcasts the list M (revealing his detector basis choices), while simultaneously, Alice broadcasts her list P (revealing her encoding basis choices). Alice separates each of her lists R, P, α, and U into two distinct lists corresponding to data associated with qubits prepared and measured in the same basis, and those that were not. For example, R is split into the lists Fr (same basis), R≠ (different basis), etc. with the time ordering preserved. Bob does the same for his lists D, M, β and V.

(8) Alice broadcasts the different basis key list R≠.

(9) Bob calculates the average of his weak measurement results β≠ (for which Alice's and Bob's bases disagree) conditional on the associated bit values in R≠ that Alice used to encode the photons.

Bob checks that these averages are "close enough" those specified by the weak values of the observables measured with the particular pre-selected states determined by R≠ and the local unitary transformations defined by V≠. Bob also calculates the overall mean and variance of his weak measurement results β≠, and the variance conditional on the preparation states.

(10) Bob announces to Alice whether or not the statistics of his weak measurements have passed the security tests. If they did not pass, Alice and Bob abort the protocol, otherwise they proceed.

(11) Bob broadcasts the results of his measurements D≠ (for which the bases disagreed).

(12) Alice calculates the average of her weak measurement results α≠ conditional on the associated values for Bob's measurement outcomes D≠.

If no Eve is present, these conditional averages will be consistent with the associated weak values of the weakly measured observables given by Bob's measurement outcomes and Alice's local unitary transformations defined by U≠. Alice also calculates the overall mean and variance of her weak measurement results a≠, and the variance conditional on the final measurement outcomes.

(13) If the conditional and marginal statistics of Alice's weak measurement results are "close enough" to those that are expected, Alice will announce that the channel is secure, otherwise Alice and Bob abort the protocol.

(14) Alice and Bob perform key reconciliation and privacy amplification on the raw key contained in the list R≠ (the subset of R where P and M agree) to produce a shorter, error free and secure key.

Figure 1:
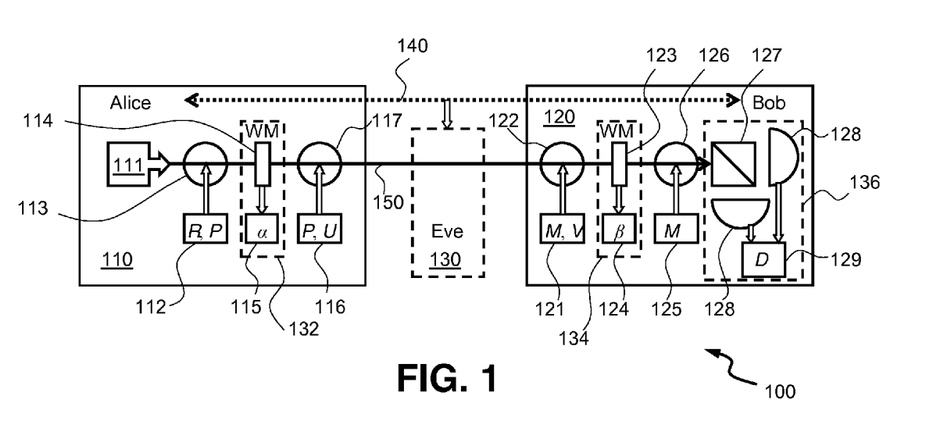
FIG. 1 is a diagram view of an exemplary QKD protocol.

FIG. 1 shows a diagram view 100 of a QKD protocol. The details of specific components are subsequently described in further detail. A first communicator 110 identified as Alice operates with a transmitter 111, a first list generator 112, a first channel link 113, a first weak measurement instrument 114 that yields a first weak value 115, a second list generator 116 and a second channel link 117. Alice desires to communicate with a second communicator 120 identified as Bob. The second communicator 120 includes a third list generator 121, a third channel link 122, a second weak measurement instrument 123 that yields a second weak value 124, a fourth generator 125, a fourth channel link 126, a beam splitter 127 that send signals to orthogonal receivers 128 connected to a strong detector 129.

An eavesdropper 130 identified as Eve has access to select portions of Alice's and Bob's equipment. In particular, the eavesdropper 130 controls a first link 132 to access the first weak measurement 114 and its resultant value 115, a second link 134 to access the second weak measurement 123 and its resultant value 124, and a third link 136 to access the beam splitter 127, receivers 128 and detector 129. Alice and Bob communicate over an authenticated classical channel 140 (without effective security from interception) and a quantum channel 150. A bit message over the classical channel 140 from Alice can be intercepted by Eve and reproduced to be forwarded to Bob. Eve also has access to the quantum channel 150. However for conventional protocols, a qubit message over the quantum channel 150 cannot be so readily intercepted without revealing the intrusion. The exemplary protocol further reduces interception vulnerability from an FS-attack.

The first list generator 112 produces lists R and P. The second list generator 115 produces lists P and U. The third list generator 121 produces lists M and V. The fourth list generator reproduces list M. The first weak measurement 115 is denoted as α. The second weak measurement 124 is denoted as β. The detector produces the strong measurement list D.

One can detail the weak values (and thus conditional weak measurement results) expected by Alice and Bob when Eve is not present. For simplicity, all of Alice and Bob's unitaries can be set to the identity, and one can assume that the detectors have no dark counts. Both of these assumptions will be rescinded while proceeding.

The four states used in the protocol are $|0\rangle$, $|1\rangle$ and $|\pm\rangle$, with:

$$|\pm\rangle = \frac{1}{\sqrt{2}}(|0\rangle + |1\rangle) \tag{10}$$

and the eigenstates of spin such that $$\hat{\sigma}_0|0\rangle = +|0\rangle \tag{11}$$

$$\hat{\sigma}_0|1\rangle = -|1\rangle \tag{12}$$

$$\hat{\sigma}_1|+\rangle = +|+\rangle \tag{13}$$

$$\hat{\sigma}_1|-\rangle = -|-\rangle \tag{14}$$

As noted earlier, the basis $\{|0\rangle\ |1\rangle\}$ can be referred to as "Basis 0" and the basis $\{|+\rangle\ |-\rangle\}$ as "Basis 1". The weak measurement conditional averages (divided by the coupling strength parameter) are the weak values of the observables. In the case that Bob strongly measures the photon in Basis 0, he will first weakly measure in Basis 1. If Bob has measured in the opposite basis from Alice's preparation, Bob's resulting weak values as defined by Alice's preselected states are:

$$^0(\sigma_1^B)_w^{\pm} = \frac{\langle 0|\hat{\sigma}_1^B|\pm\rangle}{\langle 0|\pm\rangle} = \pm 1, \text{ and} \tag{15}$$

$$^1(\sigma_1^B)_w^{\pm} = \frac{\langle 1|\hat{\sigma}_1^B|\pm\rangle}{\langle 1|\pm\rangle} = \pm 1. \tag{16}$$

In the dual cases where Bob strongly measures in Basis 1 (weakly measuring in Basis 0) and Alice has prepared the state in Basis 0, Bob's resulting weak values are:

$$^{\pm}(\sigma_1^B)_w^0 = \frac{\langle 0|\hat{\sigma}_1^B|\pm\rangle}{\langle 0|\pm\rangle} = \pm 1, \text{ and} \tag{17}$$

$$^1(\sigma_1^B)_w^{\pm} = \frac{\langle 1|\hat{\sigma}_1^B|\pm\rangle}{\langle 1|\pm\rangle} = \pm 1. \tag{18}$$

More generally, written in terms of the corresponding elements r, $p_i$, and $d_i$ in the lists R≠, P≠, and D≠, Bob's weak values are:

$$^{d_i}(\sigma^B_{m_i \oplus 1})^{r_i}_w = \frac{\langle d_i | \hat{\sigma}^B_{m_i \oplus 1} | r_i \rangle}{\langle d_i | r_i \rangle} = (-1)^{r_i}, \quad (19)$$

where $\oplus$ denotes addition modulo 2. Bob can separate the list $\beta^a$ into two subensembles conditioned on the bit value Alice used to encode the photons. From the weak values, Bob knows that the averages of the two subensembles of weak measurement results should be given by $+1(r_i=0)$ and $-1(r_i=1)$ multiplied by the weak measurement coupling parameter.

The weak values revealed by Alice's weak measurements a conditional on Bob's measurement outcomes are given by:

$$^0(\sigma^A_0)^{\pm}_w = \frac{\langle 0 | \hat{\sigma}_0 | \pm \rangle}{\langle 0 | \pm \rangle} = \pm 1, \text{ and} \quad (20)$$

$$^1(\sigma^A_0)^{\pm}_w = \frac{\langle 1 | \hat{\sigma}_0 | \pm \rangle}{\langle 1 | \pm \rangle} = \pm 1. \quad (21)$$

and the cases with bases reversed are:

$$^{\pm}(\sigma^A_1)^0_w = \frac{\langle \pm | \hat{\sigma}_1 | 0 \rangle}{\langle \pm | 0 \rangle} = \pm 1, \text{ and} \quad (22)$$

$$^{\pm}(\sigma^A_0)^1_w = \frac{\langle \pm | \hat{\sigma}_1 | 0 \rangle}{\langle \pm | 0 \rangle} = \pm 1. \quad (23)$$

Written in terms of the corresponding list elements $r_i$, $p_i$, and $d_i$, Alice's weak values are:

$$^{d_i}(\sigma^A_{p_i \oplus 1})^{r_i}_w = \frac{\langle d_i | \hat{\sigma}^A_{p_i \oplus 1} | r_i \rangle}{\langle d_i | r_i \rangle} = (-1)^{d_i} \quad (24)$$

Using these relations, Alice is similarly able to calculate the averages of her weak measurement averages conditional on Bob's measurement outcomes.

In order to secure the protocol against Eve altering or faking Alice and/or Bob's weak measurement results, the protocol implements randomly selected unitaries just after Alice's weak measurement and just before Bob's. The effect of these unitaries is to scramble the relationship between the pre-selected and post-selected states and the associated weak value. Therefore, in order for Eve to correctly fake the weak measurement results for all of the photons, she must already know both of the lists elements U and V.

The sign of Alice's (Bob's) weak values are flipped depending on the local unitary $v_i(v_i)$. Therefore, the weak value of Alice's measurement for each photon is given by:

$$^{d_i}(\sigma^A_{p_i \oplus 1})^{r_i}_w = \frac{\langle d_i | \mathcal{V}_i \mathcal{U}_i \hat{\sigma}^A_{p_i \oplus 1} | r_i \rangle}{\langle d_i | \mathcal{V}_i \mathcal{U}_i | r_i \rangle} = (-1)^{d_i \oplus u_i}. \quad (25)$$

One can observe that the sign of the weak value is determined by both Bob's post-selection outcome $d_i$ and the bit value $u_i$ which determines Alice's local unitary. Bob's weak values are:

$$^{d_i}(\sigma^B_{m_i \oplus 1})^{r_i}_w = \frac{\langle d_i | \hat{\sigma}^B_{p_i \oplus 1} \mathcal{V}_i \mathcal{U}_i | r_i \rangle}{\langle d_i | \mathcal{V}_i \mathcal{U}_i | r_i \rangle} = (-1)^{d_i \oplus v_i}. \quad (26)$$

Here the signs of the weak values are equally determined by both Alice's pre-selected state given by the raw key bit $r_i$ and Bob's local unitary as determined by $v_i$.

For concreteness, one can assume that both Alice and Bob's weak measurement pointer states are real-valued Gaussians in momentum space with unit uncertainty and zero initial mean value. The general problem Alice and Bob have is to estimate the number of errors that have occurred in the transmitted qubits in the cases where Alice and Bob have measured in opposite bases. This estimate is a fair estimate of the total QBER for the all of the qubits because Eve has no way of biasing the statistics without knowing Alice's choices of bit values (i.e., the raw key itself), the final measurement results from Bob's detector, and the particular unitaries applied by Alice and Bob to each qubit.

For two Gaussian probability distributions with means $\mu_0$ and $\mu_1$, both with variance $\sigma^2$, with Z samples taken from the distribution, the probability of correctly distinguishing between them is:

$$P_{dist} = \text{erf}\left( \frac{\sqrt{Z} | \mu_0 - \mu_1 |}{\sqrt{2} \, \sigma} \right). \quad (27)$$

For Eve to be successful she must avoid detection by both Alice and Bob. When Eve is not present, the weak measurement results are given by draws from a Gaussian distribution with mean value:

$$\langle P \rangle = g \text{Re} |A_w|, \quad (28)$$

and variance:

$$\sigma 2 = 1 \quad (29)$$

In order to predict the observed conditional weak measurement result in the presence of Eve, one uses the generalized weak value of J. Dressel et al., "Contextual-value approach to the generalized measurement of observables", *Physical Rev. A* 85, 022123 (2012), preprint available at http://arxiv.org/pdf/1110.0418v2.pdf, that applies to cases with mixed initial state $\rho_i$, and/or final measurement result (the post-selection) specified by the POVM $\hat{E}_j$. In the case of pure pre-selected and post-selected states with unitary evolution in between, the generalized weak values and the weak value of Aharonov et al. (*Physical Review A*, 2005) coincide.

The real part of an observable's generalized weak value is given by trace function ratio:

$$\text{Re}|A_w| = \frac{Tr\lfloor \hat{E}_f \{ \hat{A}_i \rho_i \} \rfloor}{2 Tr \lfloor \hat{E}_f \rho_i \rfloor}. \quad (30)$$

For example, if the initial state prepared by Alice is either $|\pm\rangle$, the state after Eve's interaction is given by $\rho_i$, and Bob observed the final outcome $|0\rangle$, Bob's generalized weak value of $\hat{\sigma}_1^B$ is:

$$Re|A_w| = \frac{Tr[|0\rangle\langle 0|\{\hat{\sigma}_1\rho_i\}]}{2Tr[|0\rangle\langle 0|\rho_i]}. \quad (31)$$

Just as with pure weak values, a system's generalized weak value can be directly observed by the shift in a weak measurement pointer.

When the occurrences of bit errors are independent of the basis and bit value the channel is known as a "depolarizing channel". In the case when Eve interacts with each photon in the same manner, e.g., a simple intercept/resend strategy, measuring in a random basis and resending the outcome to Bob, the quantum channel between Alice and Bob is a depolarizing channel. The precise probability of a bit flip for each photon depends on the measurement strategy Eve employs, e.g., projective or POVM. In general Eve's interference will not always produce a depolarizing channel. Such is the case in both USD and detector blinding attacks. Subsequently, one can examine the effect of each type of interference on Alice and Bob's conditional weak measurement results.

The particular effect on Alice and Bob's weak measurement averages will depend on the strategy Eve chooses to eavesdrop on the quantum channel. Both USD and detector blinding attacks are examined further in the disclosure, as well as the effect of a straightforward intercept/resend attack. For concreteness, one imagines that Eve's interaction with the qubit channel causes the pre-selected state to flip to the orthogonal state with probability p. Further, the observed conditional results of Bob's weak measurements can be calculated. The effect of Eve's presence is to turn the pure state encoded by Alice for a given bit value into a mixed state. Thus, the initial state at the time of Bob's weak measurement is given by:

$$\rho_i(1-p)|\psi\rangle\langle\psi|+p|\psi_\perp\rangle\langle\psi_\perp| \quad (32)$$

where $|\psi\rangle$ is the original pure pre-selected state before the noise channel has been applied and $|\psi_\perp\rangle$ is the state orthogonal to it. For the purpose of this calculation, the pre-selected state can be set by the unitary:

$$|\psi\rangle = v_i|\pm\rangle. \quad (33)$$

Thus post-interception state can be expressed as:

$$\rho_i(1-p)|v_i^{-1}|\pm\rangle\langle\pm|v_i+pv_i^{-1}|\mp\rangle\langle\mp|v_i, \quad (34)$$

where the second equality comes from the fact that Alice's unitary is either the identity or a phase flip in the encoded basis. Using Dressel's equation for the real part of the generalized weak value for Bob's measurement of $\hat{\sigma}_1$, one obtains:

$$Re|^0(\sigma_1^B)_w^\pm| = \frac{Tr[|0\rangle\langle 0|\{\hat{\sigma}_1 \mathcal{V}_i^{-1}\rho_i\mathcal{V}_i\}]}{2Tr[|0\rangle\langle 0|\mathcal{V}_i^{-1}\rho_i\mathcal{V}_i]}. \quad (35)$$

Calculating the numerator, for $v_i=0$, one obtains:

$$Tr[|0\rangle\langle 0|\{\hat{\sigma}_1\mathcal{V}_i^{-1}\rho_i\mathcal{V}_i\}] = Tr[|0\rangle\langle 0|(\pm 1)\cdot 2(1-p) |\pm\rangle\langle\pm|-p|\mp\rangle\langle\mp|], \quad (36)$$

while if $v_i=1$, one obtains:

$$Tr[|0\rangle\langle 0|\{\hat{\sigma}_1\mathcal{V}_i^{-1}\rho_i\mathcal{V}_i\}] = Tr[|0\rangle\langle 0|(\pm 1)\cdot 2(1-p) |\pm\rangle\langle\pm|-p|\mp\rangle]. \quad (37)$$

Therefore, in general:

$$Tr[|0\rangle\langle 0|\{\hat{\sigma}_1 V_i^{-1}\rho_i V_i\}] = (-1)^{v_i}\cdot(\pm 1)\cdot 2[(1-p)|\langle 0|\pm\rangle|^2 - p|\langle 0|\mp\rangle|^2]$$
$$= (1-2p)\cdot(-1)^{r_i\oplus v_i}. \quad (38)$$

The denominator of the generalized weak value is:

$$Tr[|0\rangle\langle 0|\{\hat{\sigma}_1 V_i^{-1}\rho_i V_i\}] = Tr[|0\rangle\langle 0|(1-p)V_i^{-1}|\pm\rangle\langle\pm|V_i + pV_i^{-1}|\mp\rangle\langle\mp|V_i]$$
$$= (1-p)|\langle 0|\pm\rangle|^2 + p|\langle 0|\mp\rangle|^2 = \frac{1}{2}. \quad (39)$$

Thus, as expected, the weak value is attenuated by a factor dependent on the channel error probability p:

$$Re|^0(\sigma_1^B)_w^\pm(p)| = (1-2p)\cdot(-1)^{r_i\oplus v_i} = (1-2p)Re[(\sigma_1^B)_w(p=0)]. \quad (40)$$

If Eve performs an intercept/resend attack on the channel using projective measurements, the probability of a bit flip in the channel is 0.25, yielding an observed weak value magnitude of 0.5. The lowest error rate possibility for Eve is known to be a QBER of about 0.11. Thus, the most powerful possible eavesdropping attack on the proposed protocol yields an observed weak value of 0.78. Because the probability of a bit flip is independent of the initial or final state, the attenuation of the weak value is the same for all combinations of initial and final states for both Alice and Bob's weak measurements.

One can now analyze the weak value signature for attacks that exploit Eve's ability to control Bob's detector outcomes in order to hide her presence, e.g., detector blinding attacks. For a certain fraction of the photons, say $\kappa$, Eve will perform a blinding attack so that she may perform an intercept/resend attack with a projective measurement without being detected by the estimated BER of the raw key used in the usual BB84 protocol.

Eve does not interact with the remaining photons, and so they remain unchanged. For the photons that Eve chooses to measure, Bob will only detect those for which Eve's choice of basis matches his due to Eve's blinding of his detectors. Only on photons for which Alice and Bob have measured in different bases, does the state of these photons before Bob's weak measurement and after Eve's measurement (for which Eve must have measured in a different basis from Alice) correspond to:

$$\rho_i = (1-\kappa)|\psi\rangle\langle\psi| + \kappa\frac{\hat{I}}{2} = (1-\kappa)|\psi\rangle\langle\psi| + \frac{\kappa}{2}(|\psi\rangle\langle\psi| + |\psi^\perp\rangle\langle\psi^\perp|). \quad (41)$$

This is because Eve's measurement must randomize the initial state prepared by Alice because Alice and Bob's basis choice do not match. For concreteness, one can take $|\psi\rangle = v_i|\pm\rangle$ and $|Eve\rangle = |0\rangle$.

Because the protocol tests the weak values in the cases where Alice and Bob have used different bases, detector based attacks necessarily force Alice and Eve to be in different bases. From this, one can calculate the weak value of Bob's measurement of $\hat{\sigma}_1$:

$$Tr[|0\rangle\langle 0|\{\hat{\sigma}_i^B, \mathcal{V}_i^{-1}\rho_i\mathcal{V}_i\}] = Tr[|0\rangle\langle 0|\{\hat{\sigma}_i^B, (1-\kappa)\mathcal{V}_i^{-1}|\pm\rangle \quad (42)$$
$$\langle\pm|\mathcal{V}_i + \frac{\kappa}{2}\mathcal{V}_i^{-1}|\pm\rangle\langle\pm|\mathcal{V}_i + \frac{\kappa}{2}\mathcal{V}_i^{-1}|\mp\rangle$$
$$\langle\mp|\mathcal{V}_i\}]$$
$$= Tr[|0\rangle\langle 0|(\pm 1)\cdot(-1)^{V_i}\cdot(2(1-\kappa)|\pm\rangle$$
$$\langle\pm|+\kappa|\pm\rangle\langle\pm|-\kappa|\mp\rangle\langle\mp|)]$$
$$= Tr[(\pm 1)\cdot(-1)^{V_i}\cdot\{2(1-\kappa)|0\rangle\langle 0|\pm\rangle$$
$$\langle\pm|\pm\kappa(|\langle 0|\pm\rangle|^2-|\langle 0|\mp\rangle|^2)\}]$$
$$= (\pm 1)\cdot(-1)^{V_i}\cdot 2(1-\kappa)|\langle 0|\pm\rangle|^2\pm$$
$$\kappa(|\langle 0|\pm\rangle|^2-|\langle 0|\mp\rangle|^2)$$
$$= (1-\kappa)\cdot(-1)^{r_i\oplus v_i}$$

While in the denominator one can obtain:

$$Tr[|0\rangle\langle 0|\{\mathcal{V}_i^{-1}\rho_i\mathcal{V}_i\}] = Tr[|0\rangle\langle 0|\{(1-\kappa)\mathcal{V}_i^{-1}|\pm\rangle\langle\pm|\mathcal{V}_i + \quad (43)$$
$$\frac{\kappa}{2}\mathcal{V}_i^{-1}|\pm\rangle\langle\pm|\mathcal{V}_i + \frac{\kappa}{2}\mathcal{V}_i^{-1}|\mp\rangle\langle\mp|\mathcal{V}_i\}] = \frac{(1-\kappa)}{2} + \frac{\kappa}{2} = \frac{1}{2}.$$

From this, Bob's weak value is:

$$\mathrm{Re}[^0(\sigma_1^B)_w^\pm(\kappa)] = (1-\kappa)\cdot(-1)^{r_i\oplus v_i} \quad (44)$$
$$= (1-\kappa)\mathrm{Re}[(\sigma_1^B)_w(\kappa=0)]$$

The same attenuation factor occurs for all of the subensembles defined by the four possible initial states for Bob's weak values. Therefore Bob will observe an attenuation that is directly proportional to the fraction of photons for which Eve applies the blinding attack. In the usual case that Eve performs blinding on all of the photons, one can observe that Bob will observe that all of the subensembles will have means equal to zero. This means that the detector blinding attack is actually easier to detect than the straightforward intercept/resend attack would have been by itself, because in that case, the weak value has a magnitude no less than 0.50!

In the case of detector blinding, Alice will observe no change in her weak measurement results conditional on Bob's final state. This is because Eve has succeeded in correlating Bob's final state with her own intervening measurement outcomes. However, the price Eve must pay for this correlation is the complete de-correlation between Bob's weak measurement results and Alice's initial state. In this FS-attack, Eve intercepts a fraction K of the photons and performs a probabilistic determination of the state. In the cases where the determination is inconclusive, Eve discards the photons. When the state is successfully identified, Eve transmits a qubit prepared in this state to Bob.

By focusing only on cases for which Eve permits a signal to reach Bob, and as per the protocol, for which Bob measures in opposite basis, the final state measurement by Bob becomes:

$$\hat{E}_f = (1-\kappa)|\psi_f\rangle\langle\psi_f| + \kappa\frac{\hat{I}}{2}, \quad (45)$$
$$= (1-\kappa)|\psi_f\rangle\langle\psi_f| + \frac{\kappa}{2}(|\psi_f\rangle\langle\psi_f| + |\psi_f^\perp\rangle\langle\psi_f^\perp|)$$

where $|\psi_f\rangle$ is the final state post-selected by Bob and $|\psi_f^\perp\rangle$ is the state orthogonal to it. This means that Bob's post-selection operator $|\psi_f\rangle\langle\psi_f|$ appears to the weak measurement performed by Alice as the POVM $\hat{E}_f$ as modified by the channel produced by Eve's USD attack. This is the dual to the earlier detector blinding case. Here, Eve's USD operation de-correlates the outcomes of Bob's final projective measurement from Alice's weak measurement results because in the case of a successful USD, Eve has projected the photon onto the same state in which it was prepared. This means that all of the subensembles for Alice's weak measurement results must equal their expectation values, which are equal to zero for all cases. Additionally, one must remember that the POVM due to Bob's post-selection and the noise due to Eve must also be evolved back to Alice's weak measurement interaction. Thus, the POVM is modified by Alice's local unitary, $E_f \rightarrow v_i^{-1}\hat{E}_f v_i$.

For example, explicitly calculating the weak value of Alice's weak measurement, Bob's post-selected state is taken as $|\psi_f\rangle = \mathcal{V}_i|\pm\rangle$ and $\rho_i = |0\rangle\langle 0|$ (and therefore $\hat{A}=\hat{\sigma}_1^A$) for definiteness, $$Tr[\{\mathcal{U}_i^{-1}\hat{E}_f\mathcal{U}_i\}\{\hat{\sigma}_1^A, \rho_i\}] = \quad (46)$$
$$Tr[\{(1-\kappa)\mathcal{U}_i^{-1}|\pm\rangle\langle\pm|\mathcal{U}_i + \frac{\kappa}{2}\mathcal{U}_i^{-1}|\pm\rangle\langle\pm|\mathcal{U}_i + \frac{\kappa}{2}\mathcal{U}_i^{-1}|\mp\rangle\langle\mp|\mathcal{U}_i\}$$
$$\{\hat{\sigma}_1^A, |0\rangle\langle 0|\}].$$

If $v_i=0$, this results in:

$$Tr[\{\mathcal{U}_i^{-1}\hat{E}_f\mathcal{U}_i\}\{\hat{\sigma}_1^A, \rho_i\}] = \quad (47)$$
$$Tr[\{(1-\kappa)|\pm\rangle\langle\pm| + \frac{\kappa}{2}|\pm\rangle\langle\pm| + \frac{\kappa}{2}|\mp\rangle\langle\mp|\}\hat{\sigma}_1^A] = \pm(1-\kappa),$$

while if $v_i=1$, one obtains:

$$Tr[\{\mathcal{U}_i^{-1}\hat{E}_f\mathcal{U}_i\}\{\hat{\sigma}_1^A, \rho_i\}] = \quad (48)$$
$$Tr[\{(1-\kappa)|\mp\rangle\langle\mp| + \frac{\kappa}{2}|\mp\rangle\langle\mp| + \frac{\kappa}{2}|\pm\rangle\langle\pm|\}\hat{\sigma}_1^A] = \mp(1-\kappa).$$

Therefore, generally the numerator is:
$$Tr[\{v_i^{-1}\hat{E}_f v_i\}\{\hat{\sigma}_1^A, \rho_i\}] = (1-\kappa)\cdot(-1)^{d_i\oplus u_i}, \quad (49)$$

and the denominator is $$Tr[\{\mathcal{U}_i^{-1}\hat{E}_f\mathcal{U}_i\}\{\hat{\sigma}_1^A, \rho_i\}] = \quad (50)$$
$$Tr[\{(1-\kappa)|\pm\rangle\langle\pm| + \frac{\kappa}{2}|\pm\rangle\langle\pm| + \frac{\kappa}{2}|\mp\rangle\langle\mp|\}|0\rangle\langle 0|] = \frac{1}{2}.$$

Thus, the real part of Alice's weak value is:

$$\mathrm{Re}[^\pm(\sigma_1^A)_w^\pm(\kappa)] = (1-\kappa)\cdot(-1)^{d_i\oplus u_i} \quad (51)$$
$$= (1-\kappa)\mathrm{Re}[(\sigma_1^A)_w(\kappa=0)]$$

From this, one can observe that Alice's weak measurement of $\hat{\sigma}_1$ will yield mean values (conditional on Bob's final measurement outcomes) that are attenuated by the fraction of signals arriving at Bob's detector on which Eve has performed state discrimination. This is true for all four of the subensembles of Alice's weak measurement results as defined by Bob's final state. Note that, just as in the detector blinding attack, the amount of attenuation is larger than in the straightforward intercept/resend strategy. The weak value becomes zero if Eve attacks all of the qubits sent by Alice. Also, Bob's weak measurement results conditional on Alice's preselected state are unchanged by the USD attack.

Dark counts will also de-correlate the pre-selected state and the observed outcome of the detectors. This means that dark counts will also reduce the observed weak values. Assuming that each of the four possible states has a unique detector with possible different dark count rates, then the largest of these will impose a secure distance limit. This limit is due to the fact that the fraction of detection events that are dark counts increases with distance in a lossy channel. In order to detect Eve and hence ensure security of the key, one must be able to distinguish between operational (secure) weak values and those due to Eve's attack. In the case of Eve's optimal coherent attack on the QKD system the weak values would be attenuated to a maximum value of 0.78, therefore the dark count fraction of detected events must be strictly less than 0.22.

If Eve is only permitted optimal cloning attacks, then the QBER due to Eve's interference is 16.7%, as reported by K. Bartkiewicz et al., "Experimental Eavesdropping Based on Optimal Cloning", *Physical Review Letters* 110, 173601 (2013), preprint available at http://arxiv.org/pdf/1206.0144v3.pdf. Therefore the maximum allowable dark count fraction is 0.334. Of course, the closer the operational (i.e., due to system noise) weak value attenuation is to that due to Eve's attack strategy, the larger the raw key block that must be in order to distinguish the weak value signatures of the secure channel and one altered by Eve's presence with a specified probability. These bounds are the most conservative possible for each attack strategy because of the assumption that Eve can control, and therefore turn off, the detector dark counts (or any other system noise) whenever she is performing an attack on the QKD system.

Figure 2:
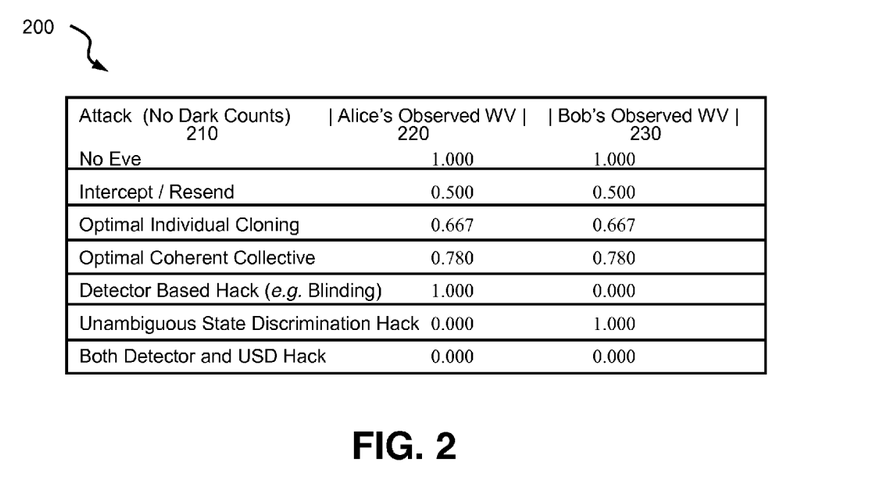
FIG. 2 is a tabular view comparing observed values for differing attacks.

FIG. 2 shows a tabular view 200 of an Attack Table. Three columns show the type of attack 310 indicated by no dark counts, Alice's observed weak value 320 and Bob's observed weak value 330. In the absence of Eve, both weak values are unity. For Eve to intercept Alice's message and resend, both weak values are one-half. For optimal individual cloning, both values are two-thirds. For optimal coherent collective, both values are the 0.78 maximum. For circumstances of hacking both the detector and USD, both values are zero. By contrast, a detector based hack, such as blinding, Alice observes unity and Bob observes zero, and for a USD hack, Alice observes zero and Bob observes unity. One can conclude that Alice and Bob can not only detect Eve; they are also able to characterize the type of attack she is utilizing.

V. Security of the Protocol: The security of the protocol rests on the ability of Alice and Bob to accurately detect Eve's presence and accurately estimate the maximum amount of information she may possess. In the usual QKD protocols, the QBER of the sifted key is estimated in order to bound Eve's information. In the weak value (WV) QKD protocol, one can estimate the QBER of the sifted key by directly measuring the strength of the correlations between the measurement outcomes and initial states using weak measurements. Any means by which Eve interacts with the photon between Alice and Bob will reduce these correlations and thereby attenuate the conditional averages of Alice and/or Bob's weak measurement results.

An intercept/resend attack is more powerful (more key bits are extracted for a given probability of detection) than when either the detector or USD attacks are performed individually, as commented earlier. Notice that this condition also applies to the case where Eve simultaneously uses USD and detector blinding in order to attempt faking Alice and Bob's weak measurement results. This is because the local unitaries v and v that have been applied to each photon are never publicly revealed.

Therefore Eve does not know the correct conditional averages in order to successfully fake Alice's or Bob's conditional weak measurement results. Assuming that Eve does not have control or influence over the unitaries v or v, one can recognize that the conditional statistics of Alice and Bob yields a fair representation of the quantum channel. Thus, the most conservative approach in estimating Eve's access to the raw key is by assuming that the attenuation of the statistics are due to disturbance by Eve. In this manner, one has replaced the fair sampling assumption required by the original BB84 protocol with the assumption that the two local unitary operations applied by Alice and Bob are unknown and uninfluenced by Eve.

Assuming that Eve's attack strategy is independent of the basis in which the qubits are encoded, then the quantum channel from Alice to Bob is a depolarizing channel with probability of error p. One can also know from the calculation above that for a depolarizing channel, the generalized weak values of the observables for Alice and Bob in the cases where the pre- and post-selection are in different bases are given by:

$$Re[A_w(p)] = (1-2p)Re[A_w(p=0)]. \qquad (52)$$

Therefore the shift in the conditional mean values of Alice and Bob's associated weak measurements is:

$$\mu = g(1-2p)Re[A_w(p=0)]. \qquad (53)$$

To estimate the probability of error due to Eve's presence, i.e., the channel's QBER, one can use the magnitude of the observed conditional weak measurements as compared to the case with no errors:

$$p = \frac{1}{2}\left(1 - \frac{\mu}{gRe[A_w(p=0)]}\right). \qquad (54)$$

Since in the case of our protocol above, $$|Re[A_w(p=0)]| = 1, \qquad (55)$$

the estimate of p simplifies to:

$$p = \frac{1}{2}\left(1 - \frac{|\mu|}{g}\right). \qquad (56)$$

From this estimate of the channel's bit error rate, one can then utilize recent results generalizing entropic uncertainty relations to smooth entropies to estimate the maximum length of extractable secure key available to Alice and Bob via privacy amplification and error correction, as reported by M. Tomamichel et al., "Uncertainty Relation for Smooth Entropies", *Physical Review Letters* 106, 110506 (2011), preprint at http://arxiv.org/pdf/1009.2015v3.pdf, further concluding that for the BB84 protocol the secure key length/is given by:

$$l \approx 2N[1-2h(\delta)], \qquad (57)$$

where h is the Shannon entropy of the channel and δ is the maximum fraction of raw key bits of the sifted key for which Alice and Bob's bases disagree.

The value of μ can be determined directly from the observed values for $\mu_{min}$ the various pre- and post-selected ensemble as calculated by Alice and Bob. Defining the minimum of the pointer shifts (over the various pre and post-selected ensembles of both Alice and Bob) to be $\mu_{min}$ and assuming that the state of the weak measurement pointers are Gaussian wavefunctions with unit variance, one can calculate δ by specifying a tolerance ε for the pointer shift estimate. This tolerance in turn determines the maximum fraction of errors in the raw key transmitted via the quantum channel:

$$\delta = \frac{1}{2}\left(1 - \frac{|\mu_{min} - \varepsilon|}{g}\right). \tag{58}$$

This follows from the effect of errors on the conditional weak measurement results; the smallest shift will give the most conservative estimate of the error rate. Attempts by Eve to bias the estimated BER by either a USD or detector attack will induce a detectable reduction in the pointer shift of either Alice or Bob respectively. Given a finite key length 2N, the probability that the magnitude of the pointer shift estimate of $\mu_{min}$ will differ from the actual value by more than a specified ε is given by $$P(\varepsilon) = 1 \, erf(\sqrt{N}|\mu_{actual} - \varepsilon|). \tag{59}$$

One can observe that specifying a smaller confidence interval for μ requires use of a raw key of longer length.

More generally, if Eve should use an attack strategy that does depend on the qubit basis, Alice and Bob would observe different attenuation factors for their various pre- and post-selected ensembles. This is because there would be different error probabilities depending on the pre-selection or post-selection bases. The analysis above should then be applied to all pre- and post-selection subensembles individually, with the protocol aborting if any of them indicate an error rate above the security threshold.

One should recognize that the analysis above applies not only to the usual eavesdropping on the quantum channel, but also to attacks where Eve performs detector blinding/control and/or state discrimination based hacking. In the case when Eve performs both USD and detector attacks, Eve could know to which pre- and post-selection ensemble each photon belongs only if she also knows the correct unitary operator applied to each photon by Alice and Bob. Without knowledge of the sequence of unitaries, Eve cannot separate the photons into the correct pre- and post-selected ensembles—and thus she will not know how to correctly bias each weak measurement result. Therefore, even if Eve could reliably control the weak measurement pointer results of both Alice and Bob, she would be not able to avoid detection and break the protocol's security.

Finally, the effect of the weak measurements themselves on the quantum channel can be further annotated. Because the key length is necessarily finite and the weak coupling will be non-zero, there will be a small amount of quantum channel noise due solely to the weak measurements. This noise will manifest itself as a depolarizing channel with error probability $p_{wm}$ given in general by:

$$p_{wm} = \langle\psi_\perp|\rangle\langle\psi_\perp|\rangle = \frac{g^2 \langle Q_{MD}^2\rangle (\Delta A)^2}{1 + g^2 \langle Q_{MD}^2\rangle\langle\hat{A}^2\rangle}, \tag{60}$$

where $Q_{MD}$ is the position of the weak measurement pointer (note that the pointer shift is being observed in momentum space as defined earlier), g is the coupling strength, and $\hat{A}$ is the observable being weakly measured, as reported by J. Tollaksen (J. Physics, 2007).

With the spin observables used in the protocol and Gaussian weak measurement pointers with unit variance, this error probability simplifies to:

$$p_{wm} = \frac{g^2}{1 + g^2}. \tag{61}$$

Since g<<1 because of the weak measurement requirement, this error probability will be very small; however this small amount will reduce somewhat the achievable secure key rate. It is reasonable to speculate that for a given level of security (as defined by the confidence interval for the estimated μ's) and a specified raw key block length there is exists an optimal coupling parameter g that will maximize the secure key length. This question will be a subject of future research into the design of a QKD system implementing the exemplary weak value protocol.

VI. Summary: This disclosure describes a version of BB84 that has been augmented with a procedure to test for the presence of Eve that, for a sufficiently long raw key block length, is secure even when Eve has complete control of Bob's detectors and control of the required weak measurements. Therefore, the exemplary protocol closes the fair sampling assumption inherent in BB84 (as well as similar QKD protocols) as implemented in practical QKD systems.

The ability to protect against all faked state attacks, without regard to the particular methods that Eve might use, is a particularly desirable feature of the protocol. In addition, the exemplary protocol requires relatively minimal changes to existing BB84 systems. Implementation of the necessary weak measurements can be accomplished by weakly coupling another observable of each photon to the particular observable used to encode the key in the BB84 protocol. For example, for phase encoded implementations, the photon's polarization can be used as a pointer for the weak measurement, and vice versa for a polarization encoded protocol.

The process can also be generalized to the complete Mutually Unbiased Basis (MUB) six-state protocol. The main difference for the six-state protocol is that in the case where the observable being weakly measured is not diagonal in either Alice's or Bob's bases, the weak value is purely imaginary. In order to observe the imaginary weak value, the weak measurement pointer must be measured in the conjugate basis. To provide experimental access to both the real and imaginary parts of the weak value for all qubits, Alice and Bob could weakly measure the required observable with two independent pointer systems, and then projectively measure each in conjugate (momentum and position) bases. Further details are available in the dissertation "Quantum Weak Values and Time-Symmetry: Foundations and Applications" as publication NSWCDD-MP-140035, incorporated by reference in its entirety.

From these pairs of weak measurement results, both the real and imaginary components of the weak values could be used to detect an eavesdropper. This weak measurement strategy could also be used to generalize the qubit protocols to higher-dimensional qudit two basis and complete MUB QKD protocols. A complete MUB qudit protocol could be especially interesting due to the very large (as compared to qubits) amount of channel information extracted per physical signal received, and the increased sensitivity of that channel information to an eavesdropper's intervention. A full characterization and security analysis of the qudit versions of the weak value protocol will be the subject of a forthcoming article.

The use of weak measurements to characterize the properties of quantum channels and quantum states in situ is an emerging area of research in quantum foundations and quantum information science. Utilizing weak measurements to directly measure and monitor the characteristics of the quantum channel in quantum communication systems is a natural, and potentially important, application of this exemplary technique. This work was supported by a grant from the Naval Surface Warfare Center Dahlgren Division In-house Laboratory Independent Research Program and the Naval Innovative Science and Engineering program.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A communication process for sending a qubit message between first and second communicants using a quantum channel for obviating a faked-state attack by an eavesdropper, said qubit message composed of ensemble bits and transmitted as a plurality of photons into the quantum channel, each photon having a corresponding bit value, said process comprising:

preparing three uniformly random bit strings each of length 4N by the first communicant to produce a first string R, a second string P and a third string U, where N is an integer corresponding to a number of the ensemble bits, said first string R represents raw key bit values, said second string P establishes a first eigenstate basis for the ensemble bits, and said third string U determines a first unitary operator v to apply to the plurality of photons in the qubit message;

preparing two uniformly random bit strings each of length 4N by the second communicant to produce a fourth string M and a fifth string V, where fourth string M that represents a second eigenstate basis for strong measure of the ensemble bits, and said fifth string V determines a second unitary operator $\upsilon$ to apply to the plurality of photons in the qubit message;

broadcasting said second string P by the first communicant and said fourth string M by the second communicant;

applying said first unitary operator $\upsilon$ to the plurality of photons to be sent by the first communicant;

recording a first time-ordered weak measurement of polarization as a sixth string $\alpha$ by the first communicant;

transmitting the plurality of photons that form the qubit message into the quantum channel by the first communicant to the second communicant;

applying said second unitary operator $\upsilon$ to the plurality of photons received by the second communicant;

recording a second time-ordered weak measurement of polarization by the second communicant as a seventh string $\beta$;

recording a strong measurement of polarization by the second communicant as an eighth string D;

segregating data that correspond to differing eigenstate bases between second and fourth strings P and M by the first communicant to truncate said first and sixth strings R and $\alpha$, and thereby respectively produce ninth and tenth strings $R^{\neq}$ and $\alpha^{\neq}$;

broadcasting said ninth string $R^{\#}$ by the first communicant;

truncating said seventh and eighth strings $\beta$ and D by the second communicant based on said differing eigenstate bases to thereby respectively produce eleventh and twelfth strings $\beta^{\neq}$ and $D^{\neq}$;

calculating a first average of results from said eleventh string $\beta^{\neq}$ by the second communicant;

comparing said first average to a statistical security threshold by the second communicant to determine satisfaction or failure of said first average as a first condition; and communicating said first condition by the second communicant to the first communicant, wherein for said first condition being unsatisfactory the protocol aborts, and otherwise;

broadcasting said twelfth string $D^{\neq}$ by the second communicant;

calculating a second average of results from said tenth string $\alpha^{\neq}$ by the first communicant based on corresponding values from said twelfth string $D^{\neq}$; and comparing said second average to said statistical security threshold by the first communicant to determine satisfaction or failure of said second average as a second condition, wherein for said second condition being unsatisfactory the protocol aborts, and otherwise;

segregating said data that correspond to agreeing eigenstate bases by the first communicant to truncate said first string R to produce a thirteenth string $R^{\neq}$ to produce a secure key for sending to the second communicant.

2. The process according to claim 1, wherein the eavesdropper has access to at least one of said first weak measurement, said second weak measurement and said strong measurements.

3. The process according to claim 1, wherein said recording a strong measurement of polarization detects the plurality of photons via orthogonal strong measurements.

4. The process according to claim 1, wherein said tenth and eleventh strings are unity for no eavesdropping.

5. The process according to claim 1, wherein said tenth and eleventh strings are one-half for interception and resending of the qubit message by the eavesdropper.

6. The process according to claim 1, wherein said tenth and eleventh strings are two-thirds for optimal individual cloning of the qubit message by the eavesdropper.

7. The process according to claim 1, wherein said tenth and eleventh strings are 0.78 for optimal coherent collective processing of the qubit message by the eavesdropper.

8. The process according to claim 1, wherein said tenth and eleventh strings are zero for hacks on said detectors and unambiguous state discrimination by the eavesdropper.

9. The process according to claim 1, wherein said tenth string is unity and said eleventh string is zero for a hack on said detectors by the eavesdropper.

10. The process according to claim 1, wherein said tenth string is zero and said eleventh string is unity for an unambiguous state discrimination hack by the eavesdropper.

11. The process according to claim 1, wherein said first unitary operator $\upsilon$ applies an identity operation to said first eigenstate basis for said corresponding bit value in said third string U being zero.

12. The process according to claim 1, wherein said second unitary operator $\upsilon$ applies an identity operation to said second eigenstate basis for said corresponding bit value in said fifth string V being zero.

13. The process according to claim 1, wherein said first unitary operator $\upsilon$ applies a phase flip to said first eigenstate basis for said corresponding bit value in said third string U being one.

14. The process according to claim 1, wherein said second unitary operator $\upsilon$ applies a phase flip to said second eigenstate basis for said corresponding bit value in said fifth string V being one.

\* \* \* \* \*